United States Patent [19]
Ueda

[11] Patent Number: 5,790,732
[45] Date of Patent: Aug. 4, 1998

[54] OPTICAL CONNECTOR WITH PROTECTIVE COATING AND METHOD OF MANUFACTURING THE SAME

[75] Inventor: Tetsuji Ueda, Tokyo, Japan

[73] Assignee: NEC Corporation, Tokyo, Japan

[21] Appl. No.: 774,423

[22] Filed: Dec. 30, 1996

[30] Foreign Application Priority Data

Jan. 11, 1996  [JP]  Japan ................... 8-002732

[51] Int. Cl.$^6$ .................... G02B 6/36; C03B 9/00
[52] U.S. Cl. .................. 385/84; 385/76; 385/77; 385/78; 385/139; 385/85; 385/52; 65/382; 65/385; 65/413; 65/423
[58] Field of Search ................. 385/76, 77, 78, 385/84, 85, 139, 52; 65/376, 382, 385, 413, 423

[56] References Cited

U.S. PATENT DOCUMENTS

| | | | |
|---|---|---|---|
| 4,729,624 | 3/1988 | Kakii et al. | 385/78 X |
| 4,994,134 | 2/1991 | Knecht et al. | 385/78 X |
| 5,257,335 | 10/1993 | Kurata et al. | 385/78 |
| 5,278,928 | 1/1994 | Ueda et al. | 385/78 |
| 5,295,213 | 3/1994 | Ueda et al. | 385/78 |

FOREIGN PATENT DOCUMENTS

| | | | |
|---|---|---|---|
| 0510703 | 10/1992 | European Pat. Off. | 385/78 X |
| 61-18485 | 6/1986 | Japan | 385/78 X |
| 5-72441 | 3/1993 | Japan | 385/78 X |

OTHER PUBLICATIONS

Patent Abstracts of Japan, P532, vol. 11, No. 2, p. 68.
Research Disclosure No. 38154 (ANON), published Jan. 10, 1996.

*Primary Examiner*—Brian Healy
*Attorney, Agent, or Firm*—Sughrue, Mion, Zinn, Macpeak & Seas, PLLC

[57] ABSTRACT

An optical connector has a ferrule for accommodating an optical fiber. The ferrule includes a glass capillary and a coating. The glass capillary is formed at the distal end portion of the ferrule and is inserted in a ceramic sleeve that performs optical connection. The glass cylinder has a first through hole at the central axis portion thereof to accommodate a bare optical fiber. The coating is made of a material having a higher hardness than that of the sleeve, and coats an entire outer circumferential surface of the glass capillary. A method of manufacturing an optical connector is also disclosed.

8 Claims, 5 Drawing Sheets

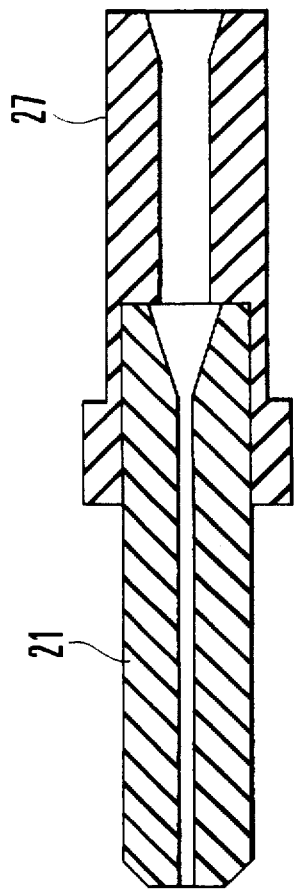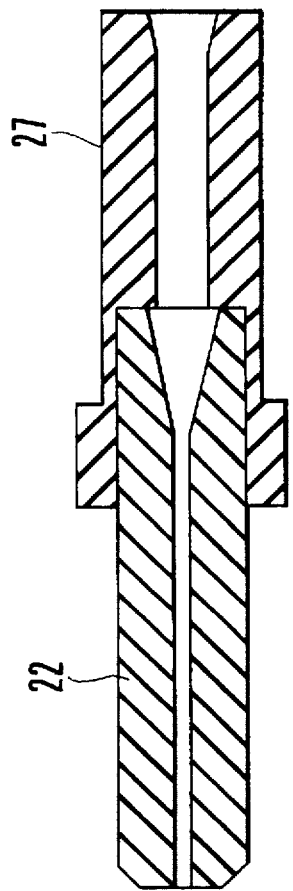
FIG. 6 PRIOR ART
FIG. 7 PRIOR ART

OPTICAL CONNECTOR WITH PROTECTIVE COATING AND METHOD OF MANUFACTURING THE SAME

BACKGROUND OF THE INVENTION

The present invention relates to an optical connector for detachably connecting optical fibers with each other and, more particularly, to the structure of an optical connector ferrule.

In order to connect optical fibers at a low loss, the end faces of the optical fibers must be placed opposite to each other on the order of submicrons. For this purpose, an optical connector uses a cylindrical precision component called a ferrule. The end portions of the optical fibers are fixed on the central axis of the ferrule, and this ferrule is aligned coaxially at high precision by using a cylindrical sleeve, thereby achieving a low loss.

For this purpose, the ferrule of the optical connector requires highly precise cylindricity and must stand a force applied during attachment and detachment. Also, the ferrule of the optical connector must be excellent in temperature stability and humidity resistance so that it will not deteriorate due to the use environment.

A conventional ferrule is made of a ceramic or the like which has a high strength and reliability in the use environment. To obtain this ceramic ferrule, ceramic is extruded into a cylinder, and this cylinder is processed by a technique called centering about a small hole at its central portion as the axial center so that its outer circumference forms a true circle at high precision. Another ferrule structure is known which is manufactured by molding a plastic to achieve high productivity and low cost.

FIGS. 6, 7, 8, and 9 show the structures of conventional optical connector ferrules. In the ferrule structure shown in FIG. 6, a high-strength material, e.g., a ceramic, is used to manufacture a ferrule 21, as described above. Since such a material is not easily processed by, e.g., grinding, and centering must be performed in a final shape as the ceramic ferrule 21, the number of ferrules that can be processed at once is limited, thus posing a problem in terms of productivity. Reference numeral 27 denotes an optical fiber-side terminal component to which the ferrule 21 is fitted and fixed coaxially.

In the ferrule structure shown in FIG. 7, a plastic is used as the material for a ferrule 22. Although the ferrule 22 can be formed by plastic molding to provide high productivity, it is difficult to manufacture the ferrule at a size precision on the order of submicrons. Also, size stability in an environment where the ferrule is used poses problems represented by an increase in outer diameter due to moisture absorption. When attaching and detaching an optical connector, the plastic ferrule 22 tends to be broken, posing a problem in strength.

As a means for solving the problems of the structures shown in FIGS. 6 and 7, a structure as shown in FIG. 8 is known. In this structure, a glass capillary 23 which can be processed easily and at high precision is used, and the outer circumferential surface of the capillary 23 is covered with a cylindrical terminal metal element 24, thereby increasing the strength of a ferrule 22. This structure is shown in, e.g., in FIG. 4 of Japanese Utility Model Publication No. 61-18485.

The structure of a glass ferrule 25 as shown in FIG. 9 is known. In this glass ferrule 25, in order to increase the strength of the glass material itself, ion exchange is performed by using borosilicate glass containing an alkali metal, thereby increasing the strength of the ferrule itself. This structure is shown in, e.g., Japanese Patent Laid-Open No. 5-72441.

In the structures shown in FIGS. 8 and 9, however, the surface hardnesses of the outer circumferential surfaces of the ferrules 24 and 25 are comparatively low. When zirconia ceramic having a relatively high hardness is used as the material for an alignment sleeve, the outer circumferential surface of the ferrule wears upon attachment and detachment due to contact with the inner wall of the sleeve. Consequently, when optical connectors are repeatedly attached and detached, scratches are formed on the side surfaces of the ferrules 24 and 25. In a structure where a glass side surface is exposed, the strengths of the ferrules 24 and 25 themselves are degraded due to the scratches.

SUMMARY OF THE INVENTION

It is an object of the present invention to provide an optical connector which is difficult to wear and is resistant to be damaged when brought into contact with the sleeve of an adapter during attachment and detachment.

In order to achieve the above object, according to the present invention, there is provided an optical connector comprising a ferrule for accommodating an optical fiber, the ferrule comprising a glass cylinder formed at a distal end portion of the ferrule to be inserted in a sleeve that performs optical connection, the glass cylinder having a small-diameter first through hole at a central axis portion thereof to accommodate a bare optical fiber, and a protection thin layer made of a material having a higher hardness than that of the sleeve to coat an entire outer circumferential surface of the glass cylinder.

BRIEF DESCRIPTION OF THE DRAWINGS

FIG. 6 is a sectional view showing an example of a ferrule used in a conventional optical connector;

FIG. 7 is a sectional view showing another example of the ferrule used in the conventional optical connector;

DESCRIPTION OF THE PREFERRED EMBODIMENT

The present invention will be described in detail with reference to the accompanying drawings.

Figure 1:
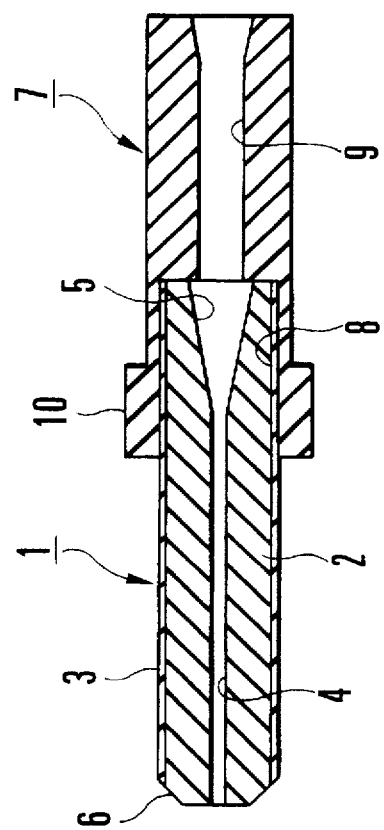
FIG. 1 is a sectional view showing an optical connector according to an embodiment of the present invention.
Figure 2:
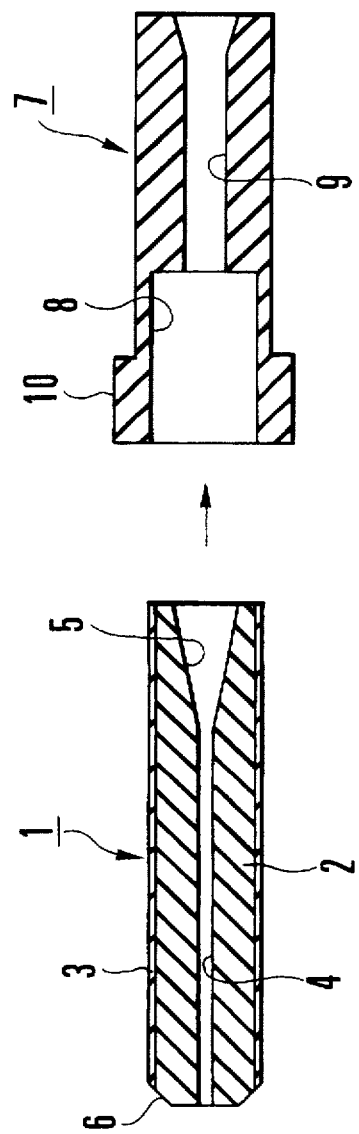
FIG. 2 is a sectional view showing the structure of the optical connector shown in FIG. 1 before assembly.

FIGS. 1 to 5 show an optical connector according to an embodiment of the present invention. As shown in FIG. 2, an optical connector ferrule of the present invention is constituted by two components. The first component is a glass ferrule 1 formed to have a truly circular section with precision on the order of submicrons. The glass ferrule 1 is constituted by a cylindrical glass capillary 2 and a coating 3 serving as a protection thin layer and having a hardness higher than that of a zirconia sleeve. The coating 3 is formed on the entire circumferential surface of the glass capillary 2 by coating to have a thickness of submicrons to about several microns.

A small-diameter through hole 4 having a diameter slightly larger than that of a bare optical fiber 11 is formed at the central axis portion of the glass capillary 2 constituting the glass capillary 2. A guide taper portion 5 is formed on one end portion of the glass capillary 2 to open wide. The inner diameter of the taper portion 5 increases toward the end face of the glass capillary 2. A chamfered portion 6 is formed on the outer circumferential portion of the other end portion of the glass capillary 2. The outer diameter of the chamfered portion 6 decreases toward the end face so that the glass capillary 2 can be easily inserted into a sleeve when attaching and detaching the optical connector.

The second component is a terminal component 7 to which the glass ferrule 1 is fitted and fixed. A large-diameter hole 8 as a blind hole is formed at one end portion of the terminal component 7. One end portion of the ferrule 1 on the taper portion 5 side is inserted and fixed in this large-diameter hole 8. An intermediate-diameter through hole 9 is formed at the central axis portion of the terminal component 7 to be continuous with the large-diameter hole 8. The through hole 9 has a diameter slightly larger than the diameter of an optical fiber 12 shown in FIG. 3. The opening portion of the taper portion 5 has a diameter slightly larger than that of the through hole 9. A projecting flange portion 10 is formed on the outer circumferential surface of the terminal component 7 near the glass ferrule 1.

Figure 3:
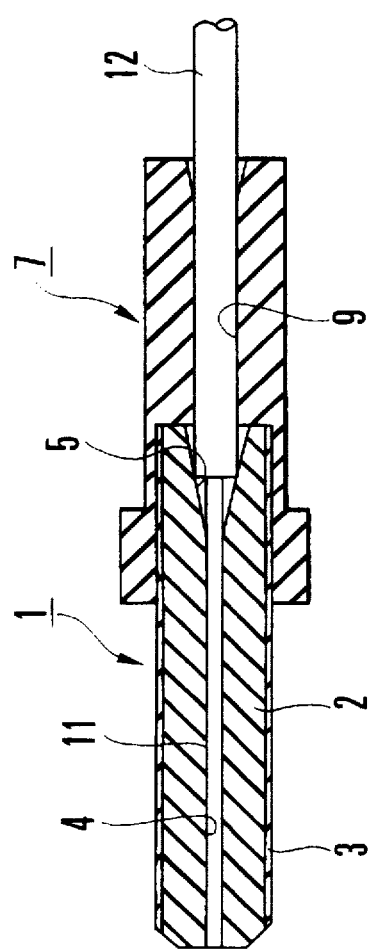
FIG. 3 is a sectional view showing a state wherein an optical fiber is fixed in the optical connector shown in FIG. 1.

The glass ferrule 1 having the above arrangement is inserted in the large-diameter hole 8 of the terminal component 7 from its one end portion on the taper portion 5 side and fixed by adhesion, so that it is assembled as shown in FIG. 1. When an optical fiber whose terminal has been processed is fixed to this assembly by adhesion, a structure as shown in FIG. 3 is obtained. At this time, the bare optical fiber 11 inserted in the through hole 9 of the terminal component or holding member 7 is guided by the taper portion 5 and is led into the through hole 4 of the glass capillary 2.

Figure 4:
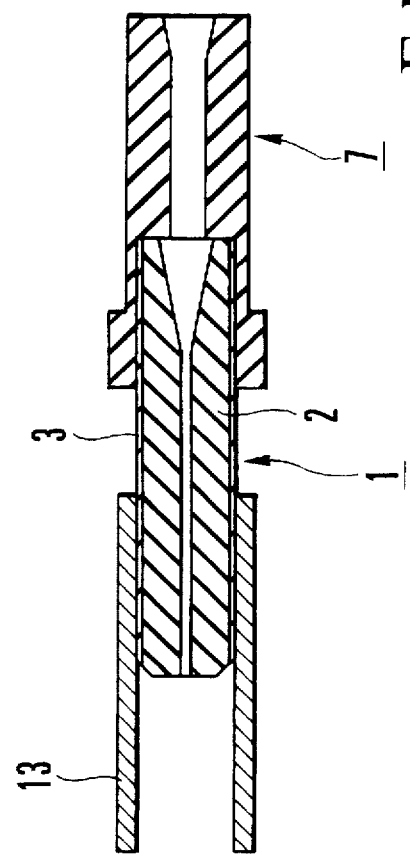
FIG. 4 is a sectional view showing a state wherein the optical connector shown in FIG. 1 is inserted in a sleeve.

In the structure of the present invention, even if the glass ferrule 1 is attached/detached to/from a zirconia ceramic sleeve 13, as shown in FIG. 4, since the coating 3 protects the outer circumferential surface of the glass capillary 2, the glass capillary 2 will not be worn by the inner circumferential surface of the ceramic sleeve 13, and scratches will not be formed on the glass capillary 2.

As the material for the coating 3 serving as the protection thin layer, ceramics, e.g., alumina, tungsten carbide, silicon carbide, boron carbide, titanium carbide, silicon nitride, boron nitride, and titanium nitride; and diamond, which have a higher hardness than zirconia ceramic used as the material of the sleeve, are suitable.

A coating 3 may also be formed on the chamfered portion 6.

Figure 5:
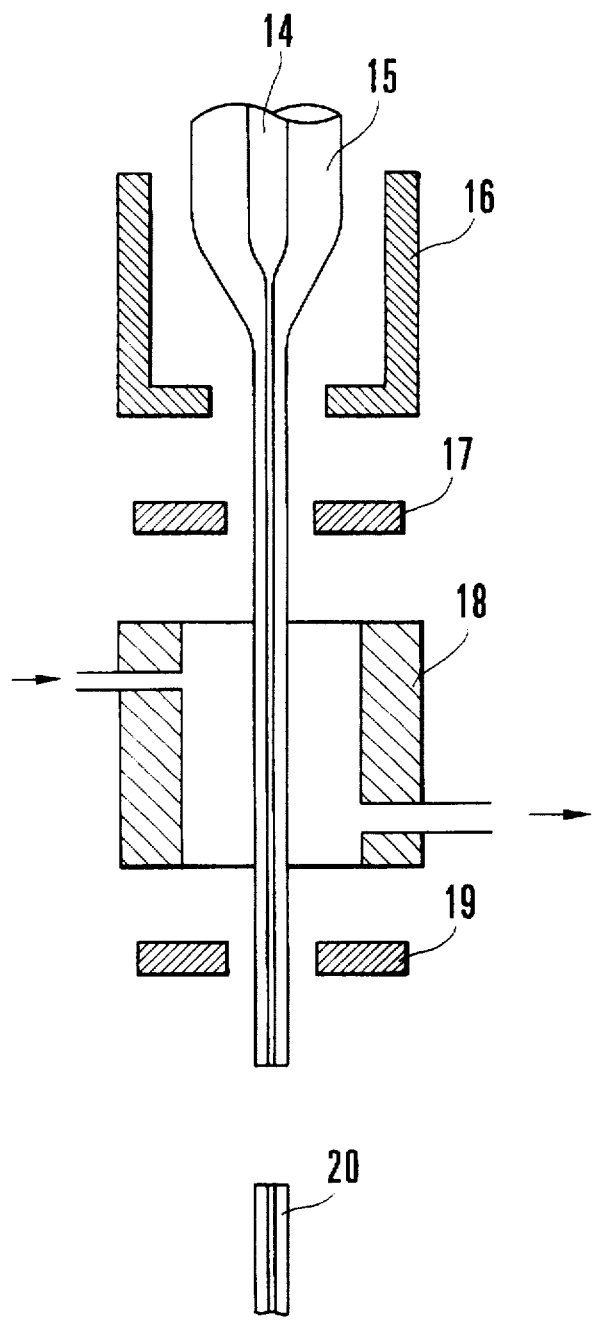
FIG. 5 is a view showing the manufacturing process of a glass ferrule shown in FIG. 1.
Figure 8:
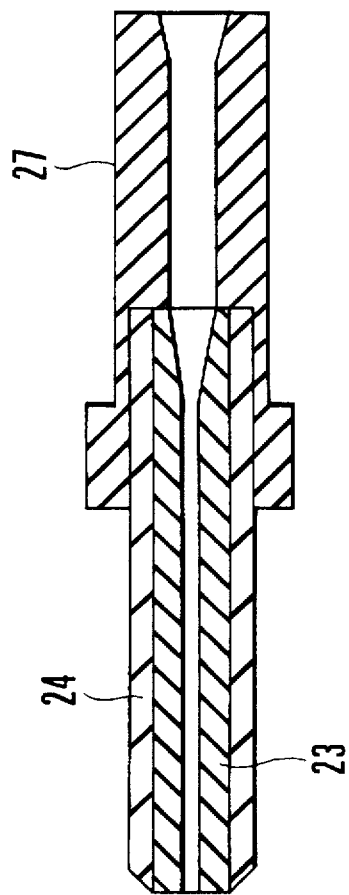
FIG. 8 is a sectional view showing still another example of the ferrule used in the conventional optical connector.
Figure 9:
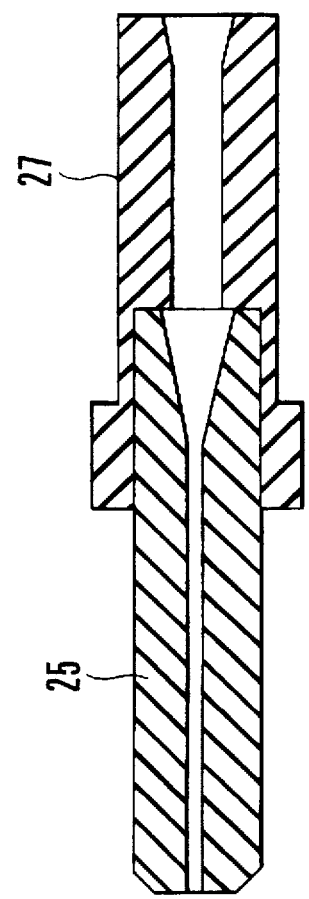
FIG. 9 is a sectional view showing still another example of the ferrule used in the conventional optical connector.

FIG. 5 explains the manufacturing process of the glass ferrule 1. First, a glass preform 15 is subjected to centering so that the ratio of the inner diameter to the outer diameter of an inner diameter 14 becomes equal to that of a final ferrule. Subsequently, the glass preform 15 is melted by a heating furnace 16 and is subjected to drawing, thereby forming the outer circumferential portion and the inner circumferential portion of the ferrule at once at high precision. The outer diameter of the ferrule before ceramic coating is managed by an outer diameter measuring machine 17. Subsequently, ceramic coating is performed on the outer circumferential surface of the ferrule by a CVD (Chemical Vapor Deposition) unit 18. The thin layer thickness of the ceramic coating is managed by an outer diameter measuring machine 19. Finally, the resultant glass preform 15 is sequentially cut into pieces having a predetermined length, thereby obtaining a starting tube 20 of the ferrule.

Thereafter, the taper portion 5 shown in FIG. 2 to help insert the optical fiber is formed by etching as a glass tube manufacturing technique using hydrofluoric acid. The chamfered portion 6 is formed by, e.g., grinding, thus obtaining the final shape of the glass ferrule 1.

In this embodiment, the CVD unit is used for manufacturing the glass ferrule 1. To perform ceramic coating, other than the method using the CVD unit, sputtering, PVD, e.g., ion plating, dipping using hydrolysis, and the like are available.

As has been described above, in the optical connector of the present invention, since scratches formed by contact with the sleeve are not formed during attachment and detachment of the optical connector, wear particles are not produced during attachment and detachment of the optical connector. Since an increase in contact resistance of the side surface of the ferrule upon formation of the scratches does not occur, the inserting force during attachment and detachment is stabilized. Since no degradation in strength caused by scratches does not occur, a glass ferrule having a stable strength can be obtained. Since the side surface of the glass ferrule is coated with a coating, the strength of the ferrule itself is increased and stabilized.

A glass capillary that can be produced by drawing on the mass production line can be used as the ferrule, and the coating can be formed by using a solvent or in accordance with CVD at once, thus providing a high productivity. Since the performance of the ferrule does not depend on the composition of the glass material, unlike in a case using ion exchange, the glass material can be selected freely.

In a glass ferrule having an alumina coating, since the alumina coating transmits ultraviolet rays, an UV (UltraViolet)-curing adhesive can be utilized for fixing the optical fiber, thus enabling assembly of an optical connector within a short period of time.

What is claimed is:

1. An optical connector comprising a ferrule for accommodating an optical fiber, said ferrule comprising:

a glass cylinder formed at a distal end portion of said ferrule to be inserted in an alignment sleeve that performs optical connection, said glass cylinder having a small-diameter first through hole at a central axis portion thereof to accommodate a bare optical fiber; and a protection thin layer made of a material having a higher hardness than that of said sleeve to coat an entire outer circumferential surface of said glass cylinder.

2. A connector according to claim 1, wherein said protection thin layer is made of one material selected from the group consisting of ceramics, alumina ceramics, tungsten carbide, silicon carbide, boron carbide, titanium carbide, silicon nitride, boron nitride, titanium nitride, and diamond.

3. A connector according to claim 1, wherein said protection thin layer is formed to have a thickness of submicrons to about several microns, prevents formation of a scratch on said glass cylinder during attachment/detachment of said ferrule to/from said sleeve, and increases a strength of said ferrule itself.

4. A connector according to claim 1, wherein said ferrule comprises a holding member having at a central axis portion thereof a second through hole of a diameter larger than that of said first through hole to hold an outer circumferential surface of a rear portion of said glass cylinder coaxially, thereby accommodating an optical fiber in said second through hole.

5. A connector according to claim 4, wherein said glass cylinder has a taper portion which is widened toward an end face thereof on a side to be held by said holding member such that the diameter of said first through hole increases in order to guide said optical fiber, and a chamfered portion on an outer circumferential surface of an end portion thereof on a side which is to be inserted in said sleeve, said chamfered portion decreasing toward said end face of said glass cylinder such that an outer diameter of said glass cylinder decreases, thereby facilitating insertion into said sleeve.

6. A method of manufacturing an optical connector, characterized by comprising the steps of:

forming a continuous glass preform by centering such that an inner diameter and an outer diameter of an inner hole thereof have a predetermined ratio;

melting and drawing said glass preform after being subjected to centering to form a ferrule shape having a predetermined inner diameter and a predetermined outer diameter;

coating an outer circumferential surface of said glass preform obtained by drawing with one of a ceramic and diamond;

cutting said glass preform after being subjected to coating to have a predetermined length, thereby forming a ferrule starting tube; and inserting and fixing said ferrule starting tube in a holding member and integrating said ferrule starting tube with said holding member.

7. A method according to claim 6, further comprising the steps of:

managing the outer diameter of said glass preform obtained by drawing before coating; and managing a thickness of said coating of said glass preform after coating.

8. An optical connector for connection into a ceramic alignment sleeve, comprising:

a ferrule for accommodating an optical fiber, said ferrule comprising:

a glass cylinder formed at a distal end portion of said ferrule to be inserted in said ceramic alignment sleeve that performs optical connection, said glass cylinder having a small-diameter first through hole at a central axis portion thereof to accommodate a bare optical fiber; and a protection thin layer made of a material having a higher hardness than that of said ceramic alignment sleeve to coat an entire outer circumferential surface of said glass cylinder.

* * * * *